United States Patent [19]

Yuasa et al.

[11] Patent Number: 4,881,798
[45] Date of Patent: Nov. 21, 1989

[54] THERMAL OPTICAL MODULATION METHOD AND DEVICE USING ALTERNATING CURRENT

[75] Inventors: Satoshi Yuasa; Hirohide Munakata, both of Yokohama; Yoko Yoshinaga, Machida; Masahiro Haruta, Tokyo; Yukuo Nishimura, Sagamihara, all of Japan

[73] Assignee: Canon Kabushiki Kaisha, Tokyo, Japan

[21] Appl. No.: 338,424

[22] Filed: Apr. 14, 1989

Related U.S. Application Data

[63] Continuation of Ser. No. 895,472, Aug. 11, 1986, abandoned.

[30] Foreign Application Priority Data

Aug. 13, 1985 [JP] Japan .................................. 60-176847
Aug. 13, 1985 [JP] Japan .................................. 60-176848

[51] Int. Cl.[4] ........................... G02F 1/01; G02F 1/17
[52] U.S. Cl. ..................................... 350/353; 350/355
[58] Field of Search ............................. 350/355, 356

[56] References Cited

U.S. PATENT DOCUMENTS

| 4,025,163 | 5/1977 | Saxe et al. | 350/391 X |
| 4,169,661 | 10/1979 | Yamada et al. | 350/353 |
| 4,260,225 | 4/1981 | Walles | 350/353 |
| 4,561,718 | 12/1985 | Nelson | 350/355 X |
| 4,711,830 | 12/1987 | Haruta | 430/52 |

FOREIGN PATENT DOCUMENTS

| 0007360 | 1/1979 | Japan | 350/353 |
| 0079334 | 5/1985 | Japan | 350/353 |

OTHER PUBLICATIONS

Lechner et al., "Liquid Crystal Natrix Displays", *Proceedings of the IEEE*, Nov. 1971, pp. 1566–1578.

Primary Examiner—Eugene R. LaRoche
Assistant Examiner—Nathan W. McCutcheon
Attorney, Agent, or Firm—Fitzpatrick, Cella, Harper & Scinto

[57] ABSTRACT

An optical modulating method is provided which comprises heating a heat-sensitive medium comprising a polymeric substance and a liquid with a heat-generating resistor adjacent to the medium, thereby modulating the light incident on the medium at the heated region. The liquid may be heated to the critical solution temperature or higher of the constituent polymeric substance.

9 Claims, 2 Drawing Sheets

THERMAL OPTICAL MODULATION METHOD AND DEVICE USING ALTERNATING CURRENT

This application is a continuation of application Ser. No. 895,472 filed Aug. 11, 1986, now abandoned.

BACKGROUND OF THE INVENTION

1. Field of the Invention

This invention relates to a novel optical modulating method and more particularly a novel optical modulating method utilizing the phase transition phenomenon of a polymeric substance which is caused by temperature change.

2. Related Background Art

Heretofore, recording or displaying using light has been widely practiced. One method for modulating light for this purpose is disclosed, for example, in Japanese laid-open patent publication No. 5523/1981 describing a modulation process by changing the electrical field distribution within a crystal having an electrochemical effect and diffracting the light introduced onto the portion of the crystal where the refractive index is changed by the electrical field distribution.

On the other hand, light modulation has also recently been a refractive index distribution based on thermal effect. Such methods are reported in "Deflection of Light by Refractive Index Change by Heat" (Nikkei Electronics, Aug. 16, 1982) and "Response Speed of TO Glass Waveguide Type Optical Switch" (All-Japan Meeting of Electronic Communication Society, 1982).

It has been also reported that a heat-sensitive material comprising an acrylamide-type polymer and water undergoes a sharp phase change between a transparent phase and an opaque phase around room temperature and that the temperature at which such change occurs can be freely set by controlling the composition of the material. The such application of the phenomena to temperature-sensitive light-shielding material, thermometer, etc., has also been considered.

Generally speaking, not only an acrylamide-type polymer but also many other polymeric substances are known to exhibit a phenomenon wherein the molecular chains transform from a random coil into a globule in an appropriate solvent around a specific temperature. This phenomenon is accompanied by change in optical properties, and since the energy required for such a change is small, this material can be preferably used for the purpose of optical modulation. Accordingly, the present inventors have already proposed an optical modulating device utilizing the phase transition phenomenon by temperature change of these polymeric substance-containing solution in U.S. patent application Ser. No. 810,249.

SUMMARY OF THE INVENTION

Methods for performing optical modulation by use of a heat-sensitive medium composed of a polymeric substance and a liquid as mentioned above should satisfy the following requirements.

(1) They can rapidly heat the medium.

(2) They can heat the medium at a specific position as desired.

(3) When the medium is repeatedly heated, there should be no deterioration of the medium or heating means.

Accordingly, a principal object of the present invention is to provide an optical modulating method which satisfies requirements (1)–(3) and, at the same time, makes the device for practicing the method smaller and thinner.

Further, another object of the present invention is to provide an optical modulating method which exhibits satisfactory response both to individual signals and to repeated on-off signals.

According to an aspect of the present invention, there is provided an optical modulating method, which comprises heating a heat-sensitive medium comprising a polymeric substance and a liquid with a heat-generating resistor adjacent to said medium, thereby modulating the liquid incident on said medium at the heated region.

According to another aspect of the present invention, there is provided an optical modulating method, which comprises heating a heat-sensitive medium comprising a polymeric substance in an adjacent liquid with a resistance heat-generating body at least to the critical solution temperature of the polymeric substance, thereby modulating the light incident on said medium at the heated region.

According to a further aspect of the present invention, there is provided an optical modulating method, which comprises heating a heat-sensitive medium composed of a polymeric substance and an adjacent liquid with a heat-generating resistor while cooling the medium, thereby modulating the light incident on said medium at the heated region. The heat-sensitive medium may be heated to the critical solution temperature of the polymeric substance, or higher.

DETAILED DESCRIPTION OF THE PREFERRED EMBODIMENTS

Figure 1:
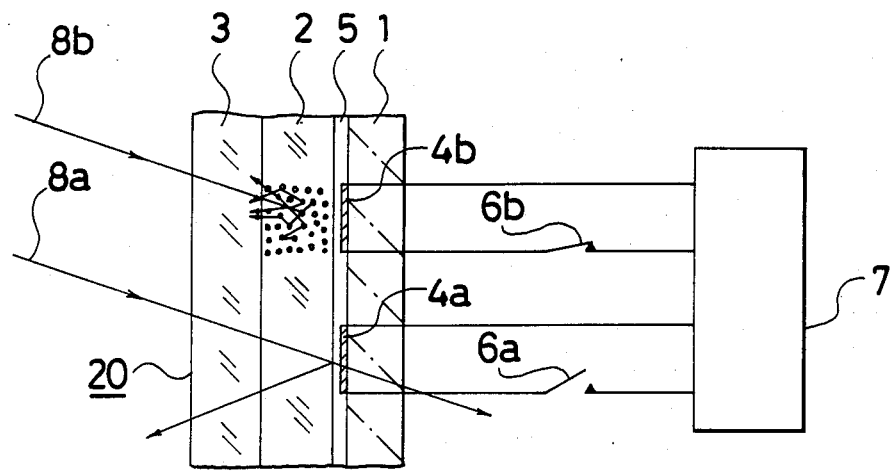
FIGS. 1 and 2 are both schematic sectional view of the optical modulating device to be used in the present invention.

The optical modulating device used in the present invention basically comprises a substrate and a transparent protective plate spaced a certain distance from said substrate with a heat-sensitive medium sandwiched between the substrate and transparent protective plate. As the heat-sensitive medium, a polymeric substance solution is employed which is capable of undergoing phase transition by temperature change.

As the above substrate and the transparent protective plate, any known material can be used, provided that it is inert to the solvent constituting the polymeric substance solution as described hereinafter. For example, when making the optical modulating device light-transmissive, as the substrate and the transparent protective plate, there may be employed transparent plastic materials such as polyolefin, polyester, polyacrylate, polyurethane, polyamide, polycarbonate and others, or a transparent inorganic material such as glass, sapphire, etc.

On the other hand, when making the optical modulating device light-reflective, the above materials may be used as the transparent protective plate, while as the substrate, there may be used materials which do not transmit light such as thin films of metals of aluminum, etc., opaque plastics, etc., or the above plastic materials having metal coatings vapor deposited thereon. These substrates and transparent protective films, in either of the transmissive type and the reflective type, may have any desired shape, and it is generally preferable to use a material with a thickness of about 0.01 to 0.4 mm.

The polymeric substance solution used as the heat-sensitve medium for the optical modulating device of the present invention is constituted so that phase transition of the polymeric substance in the liquid may occur by temperature change by selection of the combination of the polymeric substance and the liquid. These phase transitions exhibit the following optical phenomena.

(1) When the solution is in a white turbid state and light-scattering with the polymeric substance precipitated before heating, phase transition to the state which does not substantially modulate the incident light occurs by heating so that the polymeric substance is dissolved so as to make the solution transparent. It restores the original state on cooling.

(2) When the polymeric substance is in a dissolved state before heating, precipitation of the polymer occurs by heating to make the solution white turbid, thus causing a phase transition which is opposite to (1). The dissolved state is restored upon cooling.

The polymeric substance to be used in preparation of the polymeric substance solution which undergoes phase transition as described above may include polymeric substances having from relatively smaller molecular weights (called surfactants) or polymeric substances having relatively higher molecular weights, as well as crosslinked polymeric substances which cannot be dissolved completely in a liquid but can form transparent gels.

Examples of polymeric substances having relatively lower molecular weights include nonionic surfactants such as carboxylic acid esters of polyoxyethylene (e.g. polyoxyethylene laurate), ethers of polyoxyethylene and phenols (e.g. polyoxyethyleneoctyl phenyl ether), amines (e.g. polyoxyethylene stearylamine), amides (e.g., polyoxyethylene laurylamide), and the like; anionic surfactants such as sodium hexadecane sulfonate, sodium dodecyl benzene sulfonate, sodium dodecyl sulfate and the like; cationic surfactants such as hexadecyltrimethylammonium iodide, hexadecylpyridinium iodide, and the like.

Examples of higher molecular weights include polyalkenes such as polypropylene, polyisobutene, etc.; polydienes such as polybutadiene, polyisoprene, etc.; polyvinyl compounds such as polyvinyl acetate, poly(meth)acrylate, poly(meth)acrylamide, etc; polystyrenes such as polystyrene, poly-$\alpha$-methylstyrene, etc.; or photopolymerized materials obtained from monomers capable of forming these or other polymeric substances; polyethers such as polyethylene oxide, polypropylene oxide, etc.; polyimines such as polyethyleneimine, etc.; polyesters such as polyethylene succinate, polyethylene adipate, polyoxyethylene adipoyl, etc.; polyamides such as polyglycine, nylon 66, etc.; silicone type resins such as polydimethyl siloxane, etc.; polysaccharides such as cellulose acetate, aminopectin, etc.; and other polymeric substances known in the prior art and mixtures thereof.

Also, in the present invention, other than the polymeric substances capable of forming solutions as described above, it is possible to use the polymeric substances mentioned above having ultra-high molecular weights which form gels by absorbing solvent as well as crosslinked polymeric substances prepared by crosslinking the polymeric substances mentioned above. Even they crosslinked polymeric substance has the same effect so the above polymeric substance as long as its gel can undergo the reversible change between a light-transmissive state and a light-scattering upon temperature change.

The crosslinked structure of such a crosslinked polymeric substance can be formed easily according to any known method. For example, there may be employed any of the known methods such as the method in which a crosslinked structure is formed during polymerization by using partially a crosslinking agent such as a polyfunctional monomer in preparation of the above polymeric substance; the method in which the polymeric substance is provided with crosslinking sites by use of a reactive monomer in combination and a crosslinked structure is formed by utilizing the crosslinking sites and the method in which crosslinking is effected by utilizing radiation, etc.

The liquid for formation of the polymeric substance solution as mentioned above may be any of organic solvents known in the art or water, or mixtures thereof, including, for example, water, alcohols such as methanol, ethanol, propanol, ethylene glycol, glycerin, etc.; ketones such as acetone, methyl ethyl keton, etc.; ethers such as dioxane, diglyme, tetrahydrofuran, etc.; amides such as dimethylformamide, dimethylacetoamide, etc.; sulfur containing solvents such as dimethyl sulfoxide, etc.; further solutions having various solutes such as electrolytes (acid, base, salt, etc.), urea, glucose, etc., dissolved in these solvents.

The polymeric substance solution constituting the optical modulating device to be used in the present invention is formed of a polymeric substance and a solvent as described above. What is particularly important is the combination of the polymeric substance and the solvent. That is, the required combination provides that the polymeric substance in the solution may undergo the phase transition phenomenon between precipitation and dissolution according to temperature change within a moderate temperature range which is preferably from about 20° to 75° C.

In the present invention, by adequately combining a polymeric substance and a solvent to form the polymeric substance solution, the critical solution temperature exhibited by the polymeric substance (the temperature corresponding to the $\theta$ temperature of Flory for a single polymeric substance in a simple solvent) can be controlled to the range from 5° C. to 110° C., particularly preferably from 20° C. to 75° C. Thus, by making the polymeric substance solution a thin layer with a thickness of, for example, about 1 to 1000 $\mu$m, preferably from 1 to 100 $\mu$m, and applying heat locally on the thin layer, a light-transmissive portion or light-scattering portion is created immediately at the heated portion, and such light-transmissive portion or the light-scattering portion will disappear immediately when the heat is removed.

The polymeric substance solution making the desired heat response can be formed easily by selecting a solvent suitable for the selected polymeric substance, thereby controlling the solvent affinity of the polymeric substance. Alternatively, heat response can be controlled within a preferably range by forming an organic polymeric substance solution or a transparent polymeric substance gel with a relatively good solvent and adjusting the solvent affinity of the polymeric substance by mixing a relatively poor solvent thereto. Further, the heat response of the polymeric substance solution formed can be controlled to a preferable range by use of a solvent mixture in which solvents are mixed at various ratios or solutes are added at various concentrations.

The heat-sensitive medium of the optical modulating device to be used in the present invention, namely the polymeric substance solution contains a polymeric substance at a concentration generally of about 0.2 to 25 wt. %. If the polymeric substance concentration is less than the above range, the change in optical properties accompanied with temperature change becomes smaller. On the other hand, if the concentration is over the above range, the response speed of the optical modulating device will be undesirably lowered.

The optical modulating device described above will provide means for imparting heat to the polymeric substance solution layer upon information signals. Such heating means should preferably be pre-assembled within the device, but it is also possible to mount such a means on use of the device. As the heating means, any of the means known in the art can be used, but a preferable example is a heating means comprising a heat-generating resistor material which generates heat through electrical resistance.

For such a heat-generating resistor, there may be used metals or alloys such as nichrome, etc., transparent or opaque metal compounds such as hafnium boride, tantalum nitride, tin oxide, indium-tin oxide, etc., electroconductive plastics such as carbon resin, metal glaze, etc.

The optical modulating device to be used in the present invention is constituted basically as described above.

Further, for the purpose of protecting the above heating device from the polymeric substance solution, it is also effective to provide an protecting layer on the surface of the heating means. These protecting layers can be provided by forming, for example, a polymeric material which is insoluble in the solvent constituting the polymeric substance solution layer such as methyl methacrylate, butyl acrylate, styrene-acrylonitrile copolymer polyester, polyamide, etc., or an inorganic material such as silicon oxide, titanium oxide, etc., in a thickness of, for example, 10 to 50 $\mu$m. However, when such a protecting layer is formed on the heat-generating resistor, heat transfer will be obstructed in proportion to its thickness and so lower the heat response of the heat-sensitive medium comprising the polymeric substance solution. Therefore it is preferably made as thin as possible.

In the present invention, it is also possible to avoid the use of such protecting layer. However, deterioration of the constituent materials of the optical modulating device may be also caused by a defect formed on the heat-generating resistor surface during preparation of the device or the chemical reactions occurring between the materials adjacent to each other after preparation of the device, as well as upon electrolytic action. Accordingly, it is preferable to form a protecting layer from the material as mentioned above to a thickness which does not lower heat response, for example, a thickness of about 1 $\mu$m or less.

The method used for constructing the optical modulating device, namely the method of laminating the transparent protective plate, the polymeric substance solution layer, the heat-generating layer, the protecting layer and the substrate, etc. may be any of the methods known in the art.

In the present invention, the optical modulating device constructed as described above is provided with a heat-generating resistor as the heating means for the device, and optical modulation is performed by heating the polymeric substance solution by electric current flow therethrough. The current may be a direct current, but the most preferably used is an alternating current, and the objects of the present invention can be accomplished more fully by the use of an alternating current. The alternating current should be particularly one which is not overlapped with a direct current component. That is, suitable alternating currents include sine wave, triangular wave, rectangular wave, stepped wave, etc. Further, while the time between two successive inversions of current is not required to be constant, in the case of an alternate current having a constant period of 50 ms or less, its frequency may be desirably made to be 20 Hz or higher.

The other characteristic of the present invention resides in the cooling of the device by providing the device with cooling means in order to return the heat-sensitive medium to the original state by removing the heat imparted thereto by the signal input energy in carrying out optical modulation immediately when said signal input is discontinued.

For such cooling, any of the systems known in the art such as an electronic cooling device, a heat sink, a cooling fan, circulation of coolant, a heat pipe, or a combination of such systems can be utilized. These cooling means, which are generally light-intransmissive, should be provided on the side opposite to the light incident face of the device.

In the case of carrying out optical modulation using the optical modulating device described above, if, for example, the critical temperature of the heat-sensitive medium of the device is 50° C., response to the input signal at the initial stage of actuation of the device is slightly slow, while restoration is rapid. When actuation is continued, the temperature of the heat-sensitive medium will be gradually elevated until the response becomes rapid (when the temperature comes near the critical temperature of the heat-sensitive medium), while restoration becomes delayed. Finally, when the temperature of the heat-sensitive medium reaches or surpasses the critical temperature, the response characteristic will be lost. Accordingly, it is most preferable to perform the cooling so that the heat-sensitive medium may be within the range lower by several degree in centigrade than the critical temperature of the heat-sensitive medium.

Next, by referring to the accompanying drawings illustrating diagrammatically the preferred embodiments of the optical modulating method of the present invention, the present invention is described in still more detail.

In the accompanying drawings, FIG. 1 illustrates diagrammatically the method of the present invention using the light-transmissive type and the reflective type optical modulating device at the same time. In this embodiment, a polymeric substance solution which is transparent and light-transmissive at lower temperature and becomes light-scattering by precipitation of the polymer is used as the heat-sensitive medium.

The optical modulating device 20 in FIG. 1 is constituted of the substrate 1 as described above, the polymeric substance solution layer 2 as described above and the transparent protecting plate 3 as described above, and substrate 1 is provided with heat-generating resistor layers 4a, 4b, . . . as a preferable means for applying heat to the polymeric substance solution layer 2 and a very thin protecting layer 5 for protecting the heat-generating resistor layers from the solvent of the polymeric substance solution layer. The heat-generating resistor layers are connected to the external power source 7 for heat generation through switches or devices 6a, 6b for performing similar actuations.

In the optical modulating device according to such an embodiment, no power is supplied to the heat-generating resistor layer 4a when the switch is opened (6a), whereby the polymer solution layer 2 adjacent thereto is at a low temperature and therefore the layer 2 is in a transparent uniform state where the polymeric substance is compatible with the solvent. Accordingly, when the present devices are of a light-transmissive type, the incident light passes directly through 8a and is emitted without modulation from the backside of the device. On the other hand, when the present devices are of a light-reflective type, incident light is reflected or absorbed following the optical properties of the heat-generating resistor layers 4a, 4b, . . . , the protective layer 5, the colorant layer (not shown), etc. On the other hand, when the switch is on (6b), power is supplied from the external power source 7 to the heat-generating resistor layer 4b, whereby the heat generated at the heat-generating resistor layer 4b will heat the polymeric substance solution layer 2 at the adjacent portion. As a result, when the liquid temperature exceeds the critical temperature of the polymeric substance, the polymeric substance penetrates from the liquid medium, whereby the polymeric substance solution layer 2 at that portion becomes non-uniform and the incident light 8b is subjected to marked light scattering within the polymeric substance solution layer 2. Thus, the object of optical modulation can be accomplished.

In the above exemplary method, when the power supplied is direct current, since a voltage drop of 2V or more is generally caused in the heat-generating resistor layer during actuation of the device, an electrode reaction between the point in the heat-generating resistor layer as the electrode surface and the polymeric substance solution will occur when there is no protecting layer of the heat-generating resistor layer or when insulation with the protecting layer is discontinuous. In such a case, there may sometimes occur denaturation or dissolution of the constituent material of the heat-generating resistor layer or change in the solvent or solute in the polymeric substance solution. Similar phenomenon can also occur by current flow through the polymeric substance solution by dielectric polarization of the protecting material, even when there is no structural defect in the protecting layer. Therefore, when the heat-generating resistor layer of the device is driven by direct current or an alternate current overlapped with direct current, electrolytic action of the constituent material of the device may cause deterioration of the device.

In contrast, when an alternating current is used as the power supplied, chemical species once formed by electrolysis may be considered to be returned to the original chemical species by flow of current in the adverse (or opposite) direction before occurrence of the chemical reaction in the next step or diffusion of the chemical species through the liquid medium, whereby decomposition or denaturation of the constituent materials of the device are satisfactorily inhibited.

As described above, according to the most preferable embodiment of the method of the present invention, no deterioration of the constituent materials of the device will occur even when the device is actuated over a long term, even without forming of a thick protecting film on the heat-generating resistor layer.

In the embodiment described above, a material is employed which becomes light-scattering by precipitation of the polymer upon heating as the polymeric substance solution. On the contrary, when a polymeric substance solution which becomes transparent upon dissolution by heating is used, the characteristics are substantially the same as described above except that transmission and scattering of light are reversed.

Figure 2:
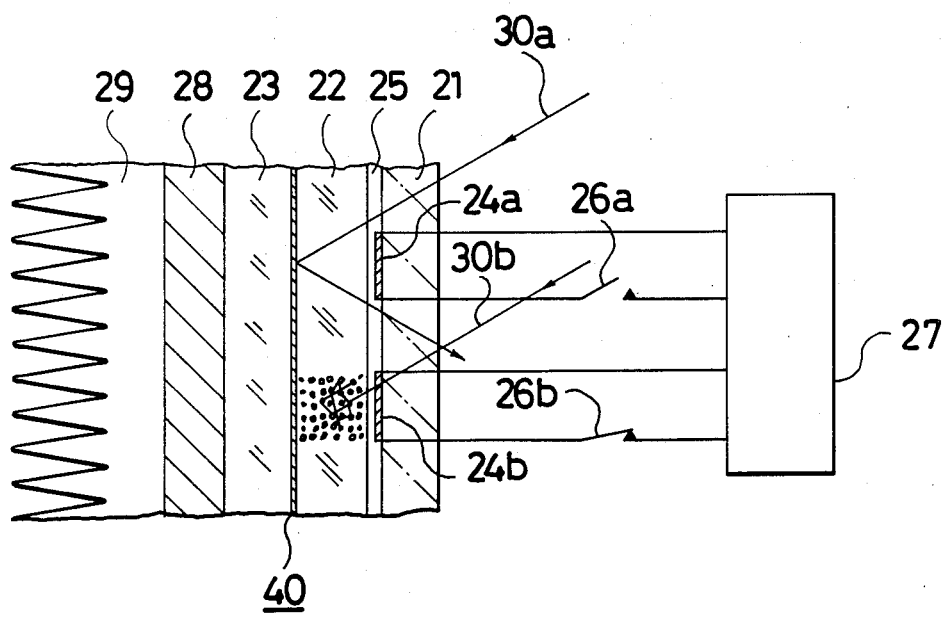

FIG. 2 in the accompanying drawings diagrammatically shows another embodiment for using a light-reflective type optical modulating device. In this embodiment, heat-sensitive polymeric substance solution media is employed which is transparent and light-transmissive at low temperature but becomes light-scattering by precipitation of polymer at high temperature.

The optical modulating device 40 in FIG. 2 is constituted of the transparent substrate 21 as discribed above, the polymeric substance solution layer 22 as described above and the protecting plate 23 as described above, and the above substrate 21 is provided with heat-generating resistor layers 24a, 24b, . . . which are preferably light-transmissive as preferable means for applying heat to the polymeric substance solution layer 22 and light-transmissive protecting layer 25 for protecting these heat-generating resistor layers from the solvent of the polymeric substance solution layer. The heat-generating resistor layers are connected to the external power source 27 for generating heat from the heat-generating layers through switches or devices for performing similar actuation 26a, 26b, etc. At the front face of the protecting plate 23 of the device 40, an electronic cooling device 28 and a heat sink 29 are provided as the cooling means.

In the optical modulating device according to such embodiment, when the switch is off (26a), no power is supplied to the heat-generating resistor layer 24a, whereby the polymer solution layer 22 adjacent thereto is at a low temperature and therefore the layer 22 is in a transparent uniform state where the polymeric substance is compatible with the solvent. Accordingly, the incident light 30a is reflected against the reflective protective plate 23 without modulation to be emitted.

On the other hand, when the switch is on (26b), power is supplied from the external power source 27 on the heat-generating resistor layer 24b, whereby the heat generated at the heat-generating resistor layer 24b elevates the temperature of the polymeric substance layer solution 22 at the adjacent portion thereof. As a result, when the liquid temperature exceeds the critical temperature of the polymeric substance, the polymeric substance will be precipitated in the liquid medium and the polymeric substance solution layer 22 at that portion becomes non-uniform, whereby the incident light 30b is subjected to marked light scattering within the polymeric substance solution layer 22. Thus, the object of the light modulation can be accomplished.

In the above exemplary method, by controlling the temperature of the polymeric substance solution to a temperature slightly lower than its critical temperature by concerted actuation with any desired means for detecting the liquid temperature of the polymeric substant solution with the cooling means 28, 29, sharp repeated response can be maintained for a long time.

The present invention is described in even more detail by referring to preferable examples of the present invention.

EXAMPLE 1

Figure 3:
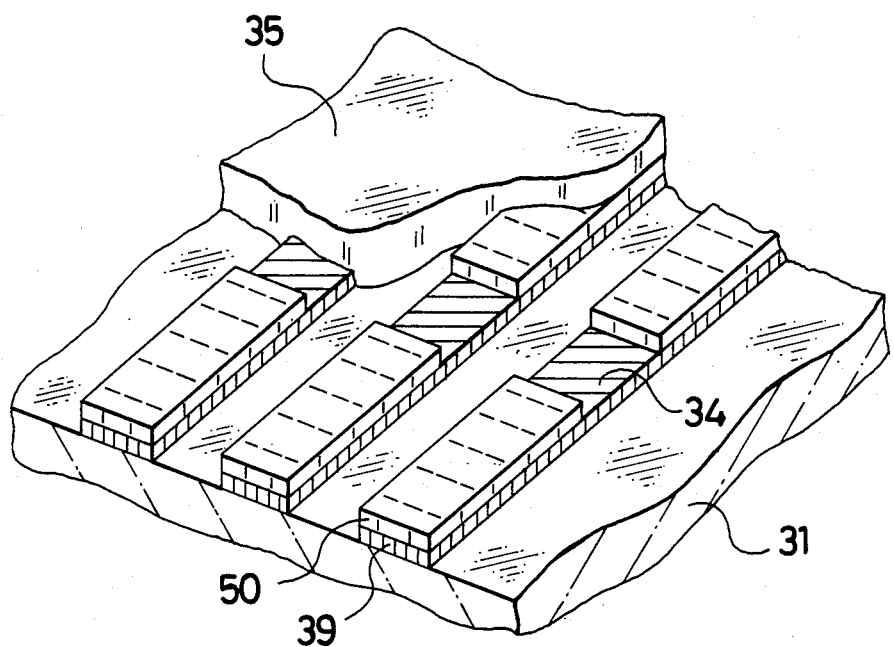
FIG. 3 is a schematic perspective view of the substrate having a heat-generating resistor used in the Examples of the present invention.

As shown in FIG. 3, on the surface of a glass plate (substrate) 31 with a thickness of 0.35 mm and a size of 40 mm×50 mm, a tantalum nitride film with a thickness of 1000 Å was formed according to the sputtering method, followed by coating of a photoresist on the film, and a stripe pattern of 20 lines/mm was printed in parallel to the shorter side of the glass plate. Then, superfluous tantalum nitride film was selectively removed by etching treatment to obtain a resistor film 39 with a desired pattern. On this film an indium-tin-oxide (ITO) film with a thickness of 2000 Å was further laminated according to the sputtering method, and again patterning was performed according to the same method to form a conductive circuit 50. The tantalum nitride film portion (size 40 μm×2000 μm) without coating of ITO is utilized as the heat-generating resistor layer 34. A crosslinked polymer film with a thickness of 10 μm was formed by applying ethyl methacrylate plasma treatment on this layer to provide a protecting layer 35.

On this layer, a Mylar film having a thickness of 100 μm, a size of 50 mm×30 mm and a window of 40 mm×10 mm opened at the center was adhered so that the heat-generating resistor layer portion may be inserted in the window.

To a solution of 0.5 g of N-isopropylacrylamide and 3 mg of ammonium persulfate dissolved in cold water, 8 ml of tetramethylethylenediamine was added, and the mixture was degassed under reduced pressure. Polymerization reaction was carried out by maintaining the mixture on a water bath at 20° C. for 30 minutes. The solution was dropped onto the window portion of the Mylar film as prepared above, and a glass plate with a size of 50 mm×30 mm and a thickness of 0.35 mm was covered thereover such that no bubbles therein, and the film periphery was sealed by use of an epoxy resin curable at normal temperature to provide an optical modulating device to be used in the present invention.

The external power source was constituted of two function generators and a power amplifier.

That is, a rectangular wave (duty ratio $\frac{1}{2}$–1/100) with a relatively longer period (20 ms–1000 ms) for determining the repeating period of device driving is generated by the first function generator, and the rectangular wave was added to the gate input of the second function generator. The second function generator was set so as to oscillate a sinusoidal alternate current with a defined frequency (20 Hz–2 KHz) when a signal is added to the gate input. This output was added to the heat-generating resistor of the optical modulating device through a power amplifier. During this operation, any desired plural number of heat-generating resistors in the same device were connected in parallel.

Next, corresponding to the information signal, a sinusoidal alternate current with a frequency of 800 Hz and an effective voltage of 22 V was to the heat-generating resistor layers of any desired combination at 40 ms per once. The position corresponding to the input information on the device changed from light-transmissive to non-light-transmissive. The optical response changed little even when the frequency of the alternate current was changed between 200 Hz and 800 Hz. Driving was performed for 48 hours with the repeating period of the gate input signal being set at 300 ms (duty ratio 13.3%), and it was confirmed that no deterioration of the optical modulating device was observed.

On the other hand, for the same optical modulating device, driving was performed under the same conditions as described above except for using a direct current pulse with a wave height of 22 V. As a result, the same result as described above was obtained at the initial stage. However, within 2 hours, bubbles which are considered to be electrolytic products of the solvent were formed in the heat-sensitive medium. Thus, it was confirmed that use of the driving method by an alternate current was more effective from the standpoint of the device life.

EXAMPLE 2

On the surface of a glass plate with a thickness of 0.35 mm and a size of 40 mm×50 mm, indium-tin-oxide (ITO) was vapor deposited to a film thickness of about 1500 Å, followed by coating of a photoresist thereon, and a stripe pattern was printed with a thickness of 1 mm in parallel to the shorter side. After etching treatment, a stripe-shaped heat-generating resistor was obtained. Further, as electroconductive circuit, a pattern-shaped vapor deposited film was prepared by providing first about 30 Å of chromium and then 250 Å of gold. The indium-tin-oxide (ITO) film portion with a size of 1 mm×2 mm without metallic coating was used as the heat-generating resistor. Further, a silicon oxide film is formed to a thickness of 500 Å as the protecting layer at the portions other than the longer side portion to be utilized later as the electrode draw-out portion to prepare a substrate having a heat-generating resistor in the form as shown in FIG. 3.

Following subsequently the same procedure as Example 1, an optical modulating device was prepared.

The optical modulating device was subjected to the same driving test under the same device constitution as Example 1 by use of an alternate current with an effective value of 16 V and a frequency of 800 Hz to obtain the same result.

EXAMPLE 3

To a solution of 4.8 g of N-isopropylacrylamide, 80 mg of N,N-methylenebisacrylamide and 30 mg of ammonium persulfate dissolved in 60 ml of cold water, 150 μl of tetramethylethylenediamine was added and the mixture was degassed under reduced pressure to provide a monomer solution. The monomer solution was sealed between the substrate and a glass similarly as in Example 1, and gelling of the monomer solution was completed by leaving the solution to stand at room temperature for 30 minutes.

For the optical modulating device thus prepared, the driving test was conducted under the same conditions as Example 1 to obtain the same result.

EXAMPLE 4

1 g of polyoxyethylenelaurylamine (Ethomeen C-15 produced by Kao Akuzo) was dissolved in 60 ml of water to provide a surfactant solution. An optical modulating device was prepared by sealing this surfactant solution in between the substrate and a glass plate similarly as in Example 1. The same driving test as Example 1 was performed to obtain the same result.

EXAMPLE 5

To a solution of 0.5 of methacrylamide and 10 mg of ammonium persulfate dissolved in 30 ml of cold water, 30 μl of tetramethylethylenediamine was added and the mixture was degassed by an aspirator. After the solution was left to stand at room temperature for 30 minutes, 25 ml of methanol was added thereto and the mixture was heated at 60° C. to provide a polymer solution. The same substrate and glass plate as Example 1 were heated to 60° C. in an oven, and the polymer solution was sealed therebetween to prepare an optical modulating device.

After being left to cool, the polymer solution within the device was found to be changed to non-light-transmissive. Then, when a sinusoidal alternate current with a frequency of 800 Hz and an effective value of 28 V was applied at 40 ms per once on the heat-generating resistor layer with connection of an external power source of the same constitution as in Example 1, the corresponding site of the device changed from non-light-transmissive to light-transmissive.

The optical response characteristic changed little even when the frequency of the alternate current was changed between 200 Hz and 800 Hz. Driving was performed for 48 hours by setting the repeating period of the gate input signal at 400 ms (duty ratio 10%), whereby it was confirmed that no deterioration of the optical modulating device was observed.

EXAMPLE 6

As shown in FIG. 3, on the surface of a glass plate (substrate) 31 with a thickness of 0.35 mm and a size of 40 mm×50 mm, a tantalum nitride film with a thickness of 1000 Å was formed according to the sputtering method, followed by coating of a photoresist on the film, and a stripe pattern of 20 lines/mm was printed in parallel to the shorter side of the glass plate. Then, superfluous tantalum nitride film was selectively removed by etching treatment to obtain a resistance film 39 with a desired pattern. On this film, an indium-tin-oxide (ITO) film with a thickness of 2000 Å was further laminated according to the sputtering method, and again patterning was performed according to the same method to form a conductive circuit 50. The tantalum nitride film portion (size 40 μm×2000 μm) without coating of ITO was utilized as the heat-generating resistor layer 34. A crosslinked polymer film with a thickness of 0.1 μm was formed by applying ethyl methacrylate plasma treatment on this layer to provide a protecting layer 35.

On this layer, a Mylar film having a thickness of 100 μm, a size of 50 mm×30 mm and a window of 40 mm×10 mm opened at the center was adhered such that the heat-generating resistor layer portion was inserted in the window.

To a solution of 0.5 g of N-isopropylacrylamide and 3 mg of ammonium persulfate dissolved in cold water, 8 μl of tetramethylethylenediamine was added, and the mixture was degassed under a reduced pressure. Polymerization reaction was carried out by maintaining the mixture on a water bath at 20° C. for 30 minutes. The solution was added onto the window portion of the Mylar film as prepared above, and a glass plate with a size of 50 mm×30 mm and a thickness of 0.35 mm was covered thereover such that no bubble was penetrated therein, and the film peripheral portion was sealed by use of an epoxy resin curable at normal temperature.

The glass plate was coated with a black acrylic paint thereon, dried on air and further coated with a silicone grease. This surface was plastered onto the cooling side face of an electronic cooling device (Peltier device) with a size of 2.54 cm×2.54 cm, and a rating of 2V6A. Also on the heat-dissipating surface of the electronic cooling device, silicone grease was coated and a copper with a thickness of 1.6 mm and a size of 120 mm×120 mm was adhered as the heat dissipator under pressure thereon. A valuable constant current power source with a rating of 5A was connected to the electronic cooling device to provide an optical modulating device.

The external power source was constituted of two function generators and a power amplifier. That is, a rectangular wave (duty ratio ½–1/100) with a relatively longer period (20 ms–1000 ms) for determining the repeating period of device driving was generated by the first function generator, and the rectangular wave was added to the gate input of the second function generator. The second function generator was set so as to oscillate a sinusoidal alternate current with a defined frequency (20 Hz–2 KHz) when a signal was added to the gate input. This output was added to the heat-generating resistor of the optical modulating device through a power amplifier. During this operation, any desired number of heat-generating resistors in the device were connected in parallel. The surface of the optical modulating device thus constituted was irradiated with a He-Ne laser beam (632.8 nm, 0.2 mW) at an angle of 45°, and the light scattered from the heat-sensitive medium was observed by a photomultiplier from the direction vertical to the device surface for evaluation of the response to the signal input. When a sinusoidal alternate current with a frequency of 800 Hz and an effective value of 22 V was first added to the electronic cooling device without supplying current at a temperature of 25° C. at 40 ms, the scattered light intensity by the device was found to begin to rise with a delay time of 5 ms relative to the power input until it reached a saturation level after 20 ms. Also, 80 ms after power supply to the resistance heat-generating layer was discontinued, the scattered light intensity began to drop, and it returned to the initial level after 150 ms.

Next, the same measurement was performed while cooling the heat-sensitive medium by passing current through the electronic cooling device. As a result, it was recognized that the rising time of the scattered light intensity became greater as the current quantity for cooling was increased, while the dropping time became smaller. Also, it was found that increase of the rising time by cooling could be inhibited by increasing the power supplied to the heat-generating resistor layer.

More specifically, when light scattering was observed after reaching thermally steady state by supplying a current of 1.6 A to the electronic cooling device and a sinusoidal alternate current with a frequency of 800 Hz and an effective value of 42 V at an interval of 50 ms for 20 ms to the heat-generating resistor layer, it was found that response occurred with a rise time to 5 ms and a drop time of 6 ms.

Thus, by use of a cooling device, the optical response speed was improved.

EXAMPLE 7

To a solution of 4.8 g of N-isopropylacrylamide, 80 mg of N,N-methylenebisacrylamide and 30 mg of ammonium persulfate dissolved in 60 ml of cold water, 150 μl of tetramethylethylenediamine was added and the mixture was degassed under reduced pressure to provide a monomer solution. The monomer solution was sealed between the substrate and a glass similarly as in Example 6, and gelling of the monomer solution was completed by leaving the solution to stand at room temperature for 30 minutes, followed by mounting the electronic cooling device and the heat radiator, etc.

For the optical modulating device thus prepared, the driving test was conducted under the same conditions as Example 6 to obtain the same result.

EXAMPLE 8

1 g of polyoxyethylenelaurylamine (Ethomeen C-15 produced by Kao Akuzo) was dissolved in 60 ml of water to provide a surfactant solution. An optical modulating device was prepared by sealing this surfactant solution between the substrate and a glass plate as in Example 6, followed by mounting the electronic cooling device and the heat radiator, etc. The same driving test as Example 6 was performed to obtain the same result.

EXAMPLE 9

To a solution of 0.5 g of methacrylamide and 10 mg of ammonium persulfate dissolved in 30 ml of cold water, 30 μl of tetramethylethylenediamine was added and the mixture was degassed by an aspirator. After the solution was left to stand at room temperature for 30 minutes, 25 ml of methanol was added thereto and the mixture was heated at 60° C. to provide a polymer solution. The same substrate and glass plate as Example 6 were heated to 60° C. in an oven, and the polymer solution was sealed thereinbetween, followed by mounting of the electronic cooling device and the heat radiator, etc., to prepare an optical modulating device. The polymer solution became opaque after it was cooled by standing.

Next, the driving test of this device was performed by use of the same testing system as Example 6. When a sinusoidal alternate current with a frequency of 800 Hz and an effective value of 22 V was first added to the electronic cooling device without supplying current at a temperature of 25° C. at 40 ms per once, the scattered light intensity by the device was found to begin to rise with a delay time of 5 ms relative to the power input until it reached a saturation level after 65 ms. In this regard, 95 ms after power supply to the heat-generating resistor layer was discontinued, the scattered light intensity began to drop, until it was returned to the initial level after 180 ms.

When light scattering was observed after reaching thermally steady state by supplying a current of 1.4 A to the electronic cooling device and a sinusoidal alternate current with a frequency of 800 Hz and an effective value of 42 V at an interval of 60 ms for 30 ms to the heat-generating resistor layer, it was found that response occurred with a rise time of 12 ms and a drop time of 10 ms.

According to the present invention, the following effects can be achieved.

(1) No optical system necessary in the case of heating by radiation is required at all.

(2) Optical modulating at high speed is possible, since the heat-sensitive medium can be heated rapidly.

(3) Since the pattern of the heat-generating resistor layer can be formed in any desired shape, any desired region of the heat-sensitive medium can be heated, whereby modulation of a desired pattern can be applied to the incident light.

(4) By use a thin resistor film for the heat-generating resistor layer, it is possible to prepare a thin-type optical modulation device.

In addition by employment of an alternate current as the current, the following effects can be obtained in addition to the above effects (1)–(4).

(5) Since deterioration by electrolysis of the construction materials during driving of the heat-sensitive medium can be prevented, the life of the optical modulating device can be elongated.

(6) Since the thickness of the protective layer separating the heat-generating resistor from the heat-sensitive medium can be made zero or very thin, heat conduction can be improved to reduce the driving power.

(7) For the same reason as mentioned above, response speed to input signal can be improved.

Further, by addition of a cooling means, optical response speed to input signal can be improved, whereby more rapid optical modulation is rendered possible.

What we claim is:

1. An optical modulating device comprising a heat-sensitive medium containing a polymeric substance and a liquid;
   a heat-generating resistor
   a protecting layer provided between said heat-sensitive medium and said heat-generating resistor; and
   means for supplying an alternating electric current with a frequency of 200 to 800 Hz to said heat-generating resistor for heating said heat-sensitive medium.

2. An optical modulating device according to claim 1, wherein said polymeric substance is a crosslinked polymeric substance.

3. An optical modulating device according to claim 1, further comprising cooling means for cooling said heat-sensitive medium.

4. An optical modulating device according to claim 3, wherein said cooling means maintains the polymeric substance in said heat sensitive medium at a temperature lower than the critical dissolution temperature thereof when said heat-sensitive medium is not heated.

5. An optical modulating device according to claim 1, wherein the alternating current supplying means supplies an alternating current which is not overlapped with a direct current component.

6. An optical modulating device according to claim 1, wherein said heat-sensitive medium undergoes phase transition when heated.

7. An optical modulating device according to claim 1, wherein the heat-sensitive medium is a thin layer having a thickness of 1 μm to 1000 μm.

8. An optical modulating device according to claim 1, wherein the polymeric substance is contained in the heat-sensitive medium at a proportion of 0.2 to 25% by weight.

9. An optical modulating method, which comprises the steps of heating a region of a heat-sensitive medium by use of a heat-generating resistor, said medium comprising a polymeric substance and a liquid, and a protecting layer being provided between said medium and said heat-generating resistor,
   supplying an alternating electric current with a frequency of 200 to 800 Hz to said heat-generating resistor to generate heat, and
   impinging light on said heated heat-sensitive medium, thereby modulating the light which is incident on said medium at the heated region thereof.

* * * * *